(12) United States Patent
Ibuki

(10) Patent No.: US 11,099,825 B2
(45) Date of Patent: Aug. 24, 2021

(54) SOFTWARE PROVIDING APPARATUS AND NON-TRANSITORY COMPUTER READABLE MEDIUM

(71) Applicant: FUJIFILM Business Innovation Corp., Tokyo (JP)

(72) Inventor: Takuya Ibuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/554,543

(22) Filed: Aug. 28, 2019

(65) Prior Publication Data
US 2020/0264861 A1    Aug. 20, 2020

(30) Foreign Application Priority Data

Feb. 19, 2019   (JP) .............................. JP2019-027191

(51) Int. Cl.
*G06F 8/65* (2018.01)
*H04L 29/08* (2006.01)
*H04L 29/06* (2006.01)

(52) U.S. Cl.
CPC ................ *G06F 8/65* (2013.01); *H04L 63/10* (2013.01); *H04L 67/34* (2013.01)

(58) Field of Classification Search
CPC ....... H04L 67/34; H04L 63/105; H04L 63/10; G06F 8/61; G06F 8/65; G06F 8/60
See application file for complete search history.

(56) References Cited

U.S. PATENT DOCUMENTS

| | | | | |
|---|---|---|---|---|
| 5,375,206 A | * | 12/1994 | Hunter | G06F 21/10 717/176 |
| 5,390,297 A | * | 2/1995 | Barber | G06F 21/105 726/29 |
| 5,671,412 A | * | 9/1997 | Christiano | G06Q 30/04 |
| 5,758,068 A | * | 5/1998 | Brandt | G06F 21/10 705/59 |
| 6,574,612 B1 | * | 6/2003 | Baratti | G06F 21/105 705/59 |
| 6,587,881 B1 | * | 7/2003 | Agarwal | G06F 9/505 709/203 |
| 7,707,115 B2 | * | 4/2010 | Goringe | G06Q 10/10 705/59 |
| 7,984,126 B2 | * | 7/2011 | McBride | H04L 41/22 709/223 |
| 10,417,397 B2 | * | 9/2019 | Ogura | G06F 21/105 |

(Continued)

FOREIGN PATENT DOCUMENTS

| | | |
|---|---|---|
| JP | 2002312312 | 10/2002 |
| JP | 2005234729 | 9/2005 |

*Primary Examiner* — Marina Lee
(74) *Attorney, Agent, or Firm* — JCIPRNET

(57) ABSTRACT

A software providing apparatus includes a decision unit and a permission unit. The decision unit decides a cap on the number of users permitted to concurrently perform download in a customer having multiple users who use software. The cap is decided when a request related to download via a network is received from one of the multiple users in the customer. The permission unit permits the user having transmitted the request to perform the download of the software if the number of users currently performing the download in the customer is smaller than the cap decided by the decision unit.

8 Claims, 6 Drawing Sheets

(56) References Cited

U.S. PATENT DOCUMENTS

| | | | |
|---|---|---|---|
| 2003/0081560 A1* | 5/2003 | Honda | H04L 43/50 370/252 |
| 2003/0158930 A1* | 8/2003 | Mc Bride | H04L 43/026 709/223 |
| 2004/0019565 A1* | 1/2004 | Goringe | G06Q 10/10 705/59 |
| 2004/0123153 A1* | 6/2004 | Wright | H04L 63/107 726/1 |
| 2005/0055578 A1* | 3/2005 | Wright | H04W 12/08 726/4 |
| 2005/0120040 A1* | 6/2005 | Williams | H04L 67/34 |
| 2006/0143131 A1* | 6/2006 | Baratti | G06F 21/6245 705/57 |
| 2006/0265467 A1* | 11/2006 | Jang | H04L 67/06 709/216 |
| 2007/0237133 A1* | 10/2007 | Woods | H04L 67/1048 370/352 |
| 2008/0052395 A1* | 2/2008 | Wright | H04L 63/20 709/224 |
| 2008/0071689 A1* | 3/2008 | Tabet | G06F 8/60 705/59 |
| 2008/0109679 A1* | 5/2008 | Wright | H04L 63/102 714/37 |
| 2008/0222235 A1* | 9/2008 | Hurst | H04L 67/42 709/201 |
| 2009/0024991 A1* | 1/2009 | Campbell | H04L 67/06 717/173 |
| 2010/0121941 A1* | 5/2010 | Harrang | H04L 67/34 709/219 |
| 2011/0307601 A1* | 12/2011 | Hogan | H04L 41/22 709/224 |
| 2013/0051226 A1* | 2/2013 | Elefant | H04W 28/0289 370/230 |
| 2015/0186133 A1* | 7/2015 | Yarra | G06F 8/65 717/121 |
| 2016/0259922 A1* | 9/2016 | Matsuo | G06F 21/12 |
| 2018/0074941 A1* | 3/2018 | Tokie | H04L 43/0876 |
| 2020/0204836 A1* | 6/2020 | Jiang | H04L 65/1059 |

* cited by examiner

FIG. 2

| SW NAME | LATEST VERSION |
|---|---|
| APP A | V1.0.19 |
| APP B | V3.1.3 |
| ⋮ | ⋮ |

FIG. 3

| ID | SW NAME | LICENSE | PURCHASER |
|---|---|---|---|
| A000 | APP A | AAA-000 | COMPANY X |
| A111 | APP A | AAA-111 | COMPANY X |
| A112 | APP A | AAA-222 | COMPANY X |
| A113 | APP B | BBB-333 | COMPANY Y |
| A114 | APP B | BBB-444 | COMPANY Y |
| A115 | APP C | CCC-555 | COMPANY X |
| A116 | APP C | CCC-666 | COMPANY X |

FIG. 4

| THE NUMBER OF PURCHASED LICENSES | PERMITTED CONCURRENT UPDATE NUMBER |
|---|---|
| UP TO 100 LICENSES | 50 |
| UP TO 1000 LICENSES | 200 |
| UP TO 5000 LICENSES | 500 |
| UP TO 10000 LICENSES | 1000 |

FIG. 7

| ID | VERSION | UPDATE STATUS |
|---|---|---|
| A050 | 1.0.19 | ACQUIRING |
| A080 | 1.0.19 | ACQUIRED |
| A102 | 1.0.10 | ACQUIRED |
| A111 | 1.0.19 | ACQUIRING |

SOFTWARE PROVIDING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-027191 filed Feb. 19, 2019.

BACKGROUND (i) Technical Field

The present disclosure relates to a software providing apparatus and a non-transitory computer readable medium.

(ii) Related Art

Software provided by a software providing operator is used by predetermined multiple users in the office in some cases. After the software providing operator upgrades the software, each user notified of the upgrade downloads an update module from the software providing operator and upgrades the software.

To date, technology for avoiding a throughput reduction possibly caused by the download of an update module concurrently performed by multiple users has been proposed (for example, Japanese Unexamined Patent Application Publication No. 2002-312312 and Japanese Unexamined Patent Application Publication No. 2005-234729). Specifically, a local server operating in conjunction with the server of a software providing operator is installed in the office. Each user in the office downloads an update module from the local server if the local server has the update module or from the server of the software providing operator if the local server does not have the update module.

SUMMARY

In the related art, the local server is prepared at the software-provided end, in other words, at the software user end, and thereby network load is reduced.

Aspects of non-limiting embodiments of the present disclosure relate to the providing of software performed in such a manner that a software provider takes into consideration network load placed on a customer of the software.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a software providing apparatus including a decision unit and a permission unit. The decision unit decides a cap on a number of users permitted to concurrently perform download in a customer having multiple users who use software. The cap is decided when a request related to download via a network is received from one of the multiple users in the customer. The permission unit permits the user having transmitted the request to perform the download of the software if the number of users currently performing the download in the customer is smaller than the cap decided by the decision unit.

BRIEF DESCRIPTION OF THE DRAWINGS

Exemplary embodiments of the present disclosure will be described in detail based on the following figures, wherein:

FIG. 2 is a table illustrating an example data structure of version information registered in a version management master in Exemplary Embodiment 1;

FIG. 3 is a table illustrating an example data structure of license information registered in a license information master in Exemplary Embodiment 1;

FIG. 4 is a table illustrating an example data structure of cap information registered in a cap master in Exemplary Embodiment 1;

FIG. 7 is a table illustrating an example data structure of update log information stored in an update-log information memory in Exemplary Embodiment 1.

DETAILED DESCRIPTION

Hereinafter, exemplary embodiments of the present disclosure will be described with reference to the drawings.

Exemplary Embodiment 1

Figure 1:
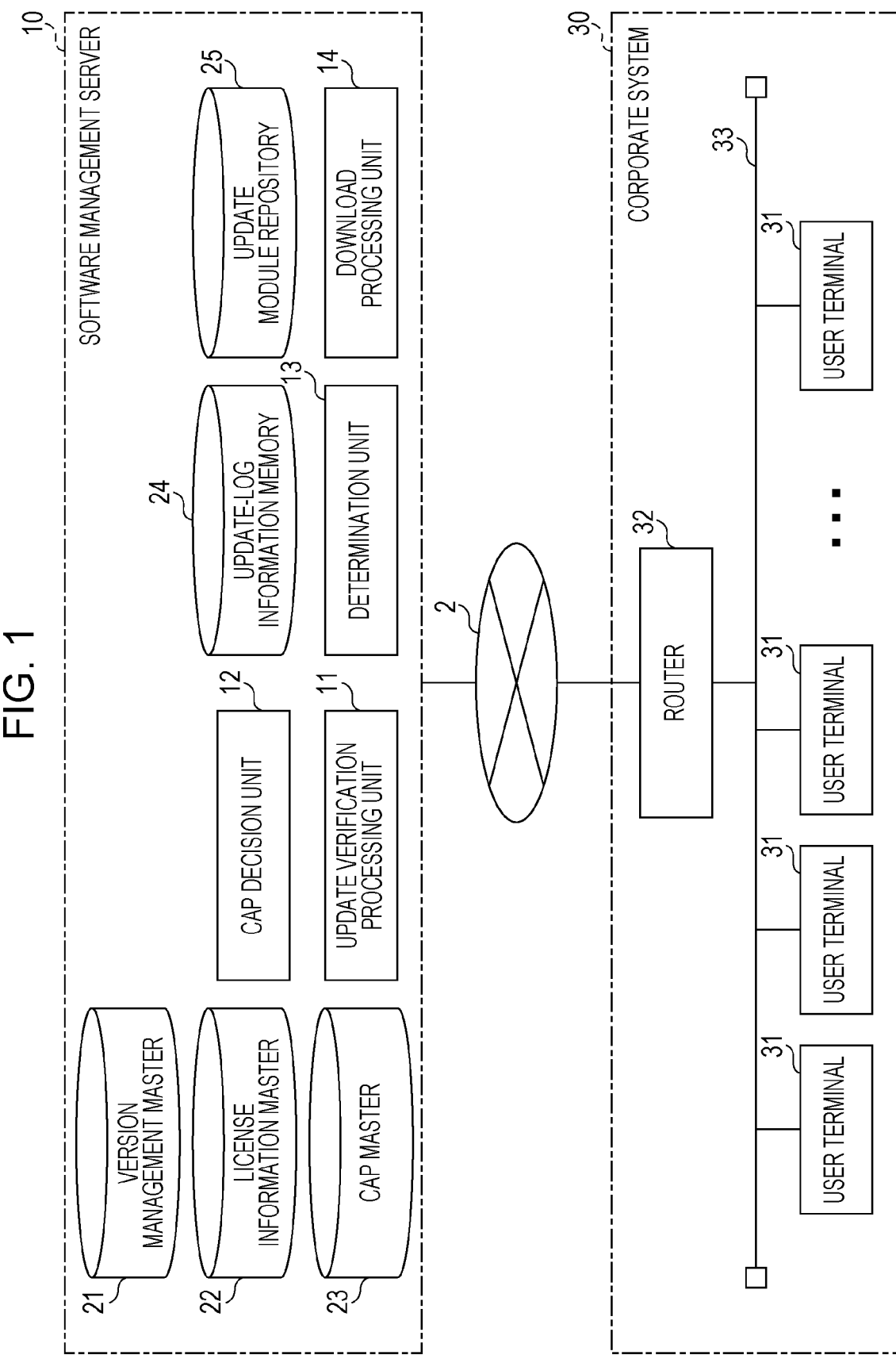
FIG. 1 is a diagram of the configuration of a network system including the software provider end and the user end in Exemplary Embodiment 1.

FIG. 1 is a diagram of the configuration of a network system including the software provider end and the user end in this exemplary embodiment. In FIG. 1, a software management server 10 is a mode of a software providing apparatus installed by an operator or the like who provides software. A corporate system 30 is a system built up in a company that is a customer using software provided from the software management server 10. The software management server 10 and the corporate system 30 are both connected to the Internet 2, and data communications may be performed through the Internet 2. Note that multiple companies conclude respective license agreements on the software management server 10 but each have the corporate system 30 in the same configuration, and thus the corporate system 30 may execute an upgrade process in the same manner. Accordingly, FIG. 1 conveniently illustrates the corporate system 30 of only one company.

The corporate system 30 is built up in such a manner that multiple user terminals 31 and a router 32 are connected to a local area network (LAN) 33. The user terminals 31 are used by respective employees or the like (hereinafter, users) of the company, and the router 32 enables data communications to be performed between each user terminal 31 and the software management server 10. Note that components not used in the description of this exemplary embodiment are omitted in FIG. 1. The user terminals 31 are terminal apparatuses used by the users in the company. For convenience of explanation, this exemplary embodiment is described on the assumption that each user uses a corresponding one of the user terminals 31, that is, the user has a one-to-one correspondence with the user terminal 31. A general personal computer (PC) is assumed as the user terminal 31 in the description. However, the user terminal 31 is not necessarily limited to the PC and may be any information processing apparatus used with software being installed. In this exemplary embodiment, an example where the user terminals 31 are used in such a manner as to be connected to the wired LAN 33 but may be configured to be connected wirelessly.

The software management server 10 manages multiple types of computer operable software and provides software for the user terminals 31 of users permitted to use the software in accordance with the license agreement with the company. The following description is provided on the assumption that the software permitted to be used in accordance with the license agreement has been installed in each user terminal 31. However, the version of the installed software is not necessarily the latest version. If the version is not the latest version, the user may update the software version with the latest version by downloading software for updating and upgrading the installed software (hereinafter, also referred to as an update module) from the software management server 10 to the user terminal 31.

The software managed by the software management server 10 in this exemplary embodiment includes an application used by a user in accordance with a license agreement and an update module for upgrading the application. In this exemplary embodiment, the term "software" denotes an application in a narrow sense. Software for upgrading an application is referred to as an update module as described above.

The software management server 10 is configured as a server computer having a general hardware configuration. Specifically, the software management server 10 includes a central processing unit (CPU), a read-only memory (ROM), a random access memory (RAM), a memory such as a hard disk drive (HDD), and a network interface serving as a communication unit. For updating or the like of master data (described later), the software management server 10 may also be provided with a mouse and a keyboard serving as an input unit, and a display serving as a display.

As illustrated in FIG. 1, the software management server 10 includes an update verification processing unit 11, a cap decision unit 12, a determination unit 13, a download processing unit 14, a version management master 21, a license information master 22, a cap master 23, an update-log information memory 24, and an update module repository 25. Note that components not used for describing this exemplary embodiment are omitted in FIG. 1.

Upon receiving an update-information verification request from a user, the update verification processing unit 11 transmits back update information including whether an upgrade is needed and whether an update module is downloadable if the upgrade is needed. When the update verification processing unit 11 receives a download-related request from a user in a company that is the customer using software via the Internet 2, that is, when an update-information verification request serving as a request related to download in this case is received, the cap decision unit 12 decides a cap on the number of users permitted to concurrently perform download in the company (hereinafter, simply referred to as a cap). The cap decision unit 12 in this exemplary embodiment decides the cap for each company on the basis of the number of licenses of the company that are derivable from the license information master 22. When the user having transmitted the update-information verification request needs the upgrade, the cap decision unit 12 operates.

As to be described later, update log information is registered in the update-log information memory 24 in such a manner as to have such a data structure that enables a user currently downloading the update module (strictly speaking, the license management number of the user) to be discriminated. The determination unit 13 compares the number of users currently performing the download in the company with the cap decided by the cap decision unit 12. If the number of users is smaller than the cap, the determination unit 13 permits the user having transmitted the update-information verification request to perform the download of the software. Note that for convenience of explanation, a user does not perform multiple download operations concurrently in this exemplary embodiment. The description is provided on the assumption that the number of users downloading the software is equal to the number of downloaded update modules. The download processing unit 14 transmits (that is, downloads) the update module in answer to a download request from the user terminal 31 used by a user determined to be permitted the download by the determination unit 13.

FIG. 2 is a table illustrating an example data structure of version information registered in the version management master 21 in this exemplary embodiment. A software name (SW name) is an application name serving as identification information regarding software, that is, an application managed by the software management server 10. The SW name is set in the version information in association with the latest version of the application.

FIG. 3 is a table illustrating an example data structure of license information registered in the license information master 22 in this exemplary embodiment. The license information is set for each user assigned a license. A SW name, a license, and a purchaser are set in association with a license ID (simply ID in FIG. 3) identifying the license. The SW name column has application names each serving as identification information regarding an application in the license agreement. The License column has the management numbers of the respective licenses, that is, identification information regarding each license like the license ID. The Purchaser column has companies who each purchase a license. The term "purchaser" has the same meaning as that of the term "customer" using the software. The management numbers of the licenses are assigned to the respective users in the company, and the assigning of each management number enables the corresponding user to use the application. Each user terminal 31 used by the corresponding user and the license management number are managed in association with each other in the corporate system 30; however, the management is not illustrated in FIG. 3.

FIG. 4 is a table illustrating an example data structure of cap information registered in the cap master 23 in this exemplary embodiment. The number of purchased licenses indicates the range of the licenses purchased by a company. Permitted concurrent update number is a total number of users permitted to concurrently perform download of an update module in a company having purchased licenses in the corresponding range. Since each user does not perform download of multiple pieces of software concurrently in this exemplary embodiment as described above, the total number of users are simply referred to as the number of users. The example numerical value in FIG. 4 illustrates that up to 50 users may download the update module concurrently, for example, in a company concluding an agreement on 100 or smaller number of licenses. In this exemplary embodiment, for each number of purchased licenses, a number smaller than the corresponding maximum value of purchased licenses (100, 1000, 5000, or 10000) is set as the permitted concurrent update number.

The update-log information memory 24 is described later together with the operation of the software management server 10. The update module repository 25 stores therein update modules each needed for updating the corresponding version of the application with the latest version.

The components 11 to 14 of the software management server 10 are implemented in cooperation between the computer configured as the software management server 10 and a program run by the CPU installed in the computer. The memories 21 to 25 are implemented by the HDD included in the software management server 10. Alternatively, the RAM or an external memory may be used via a network.

Programs used in this exemplary embodiment may be provided by using the communication unit as a matter of course or in such a manner as to be stored in a computer readable recording medium such as a compact disc (CD)-ROM or a universal serial bus (USB) memory. The programs provided by using the communication unit or the recording medium are installed on the computer and serially run by the CPU of the computer, and various processes are thereby implemented.

Figure 5:
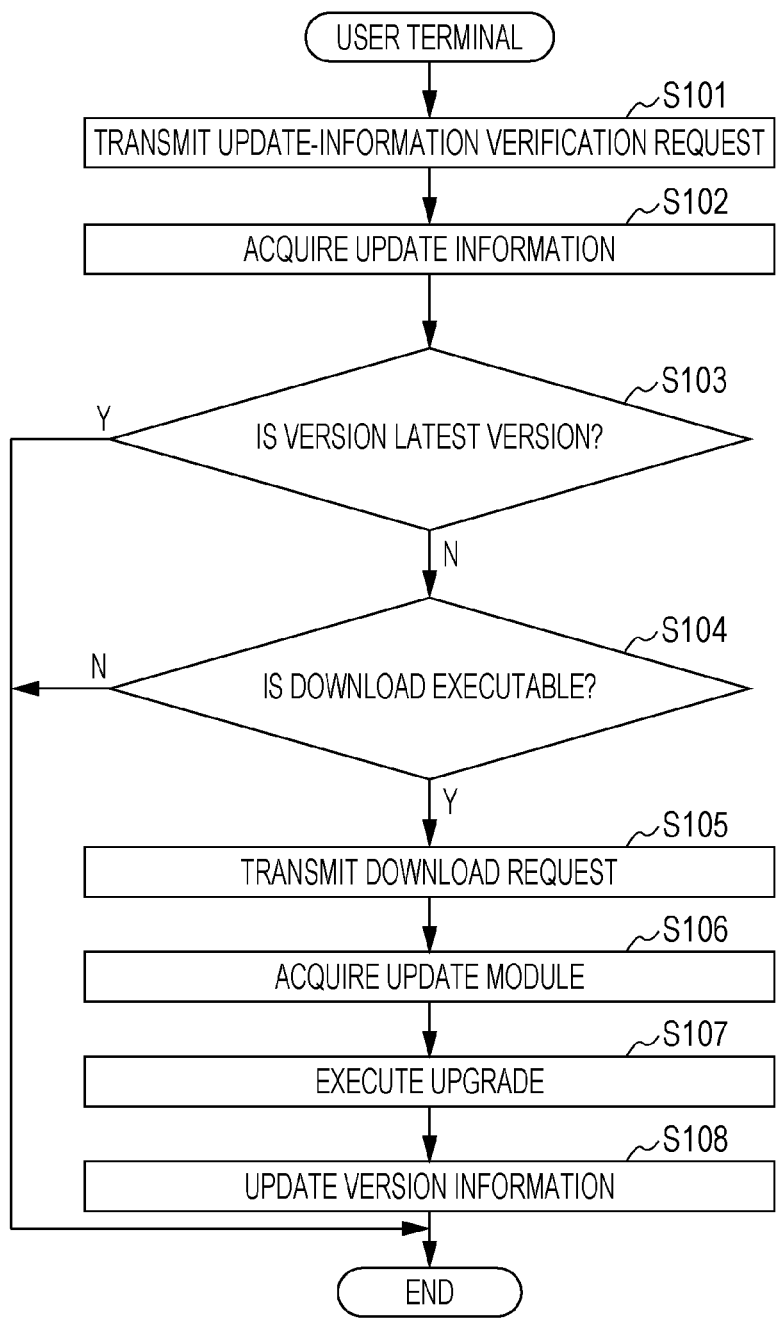
FIG. 5 is a flowchart illustrating a process executed by a user terminal when an application installed in the user terminal is upgraded in Exemplary Embodiment 1.

The processes executed by each user terminal 31 and the software management server 10 at the time of upgrading an application installed in the user terminal 31 will be described by using the flowcharts in FIGS. 5 and 6.

The user terminal 31 transmits an update-information verification request to the software management server 10 in accordance with a predetermined operation by the user (S101). The verification request includes identification information (for example, an application name) regarding an application for which the verification request is transmitted, the version of the application installed in the user terminal 31, and the license management number of the application.

Upon receiving the update-information verification request transmitted from the user terminal 31 (S121), the update verification processing unit 11 of the software management server 10 refers to the version management master 21 and thereby verifies the latest version of the application included in the verification request. If the version of the application included in the verification request matches the latest version (Y in step S122), the application installed in the user terminal 31 does not need to be upgraded because the version thereof is already the latest version. In this case, the update verification processing unit 11 sets information indicating that upgrade is not needed in the update information and transmits the update information to the user terminal 31 having transmitted the verification request (S130).

In contrast, if the version of the application included in the verification request is not the latest version (N in step S122), the update verification processing unit 11 determines that the upgrade is needed and delivers the processing to the cap decision unit 12.

The following case is described taken as an example. Specifically, Application A, V1.0.13, and AAA-000 are respectively set as an application name, a version, and a license management number in the verification request acquired from the user terminal 31. When referring to the example settings of the version management master 21, it is understood that Application A that is an application of the latest version of V1.0.19 has not been installed yet in the user terminal 31 of the user.

In this case, the cap decision unit 12 refers to the license information master 22 and acquires the number of licenses of the company to which the user having transmitted the verification request belongs (S123). In other words, matching is performed between the license management number included in the verification request and the license information master 22, and thereby the company to which the user having transmitted the verification request belongs is identified. From the example settings in the license information illustrated in FIG. 3, it is understood that the user assigned the license management number "AAA-000" belongs to Company X. The cap decision unit 12 thus adds up licenses of Company X registered in the license information master 22 and thereby acquires the number of licenses in the agreement concluded with the Company X.

Subsequently, the cap decision unit 12 refers to the cap master 23 and thereby decides the cap (S124). Assume that the number of licenses of Company X is, for example, 40 according to the example settings of the cap master 23 illustrated in FIG. 3. Since the permitted concurrent update number of Company X is 50, the cap decision unit 12 decides a permitted concurrent update number of 50 as the cap for Company X without any modification. Accordingly, in this exemplary embodiment, the permitted concurrent update number set in the cap master 23 has the same meaning as that of the cap.

Subsequently, the determination unit 13 refers to the update-log information memory 24 and thereby acquires the current download state (S125).

FIG. 7 is a table illustrating an example data structure of update log information stored in the update-log information memory 24 in this exemplary embodiment. The update log information is registered and updated by the download processing unit 14 one by one. The update log information is registered in such a manner that a license ID assigned an application upgraded or in the course of an upgrade is associated with the version and the update status of the update module for the application to be downloaded. By referring to the license information, the company having the license agreement and the application to be upgraded may be identified from the license ID. When the update module is in the course of download, Acquiring is set as the update status. When the download is complete, Acquiring is updated with Acquired. Information such as a download execution date and time may be added to cause the update-log information memory 24 to function as a log; however, items not used for explanation are omitted in this exemplary embodiment.

In this exemplary embodiment, the update-log information memory 24 is provided with the log function in such a manner that an item that is an update status is provided in the update log information and that the record is not deleted even after download is complete. However, the update-log information memory 24 may be configured to record and manage only an update module in the course of download, without providing the item of the update status.

The determination unit 13 refers to the license ID in the update log information and the license information and thereby obtains the number of users currently downloading the update module in Company X. From the example settings in the license information illustrated in FIG. 3 and the update log information illustrated in FIG. 7, it is understood that the user in Company X assigned the license ID "A111" is currently performing the download. In this manner, the determination unit 13 obtains, as a current download execution state, the number of users in Company X currently performing the download. If the number of users currently performing the download thus obtained reaches the cap decided in step S124, the determination unit 13 determines that permitting the start of further download operation leads to a network load increase in the corporate system 30 of Company X and thus leads to a throughput reduction. That is, the determination unit 13 takes the network load into consideration and determines that further download operation is to be prevented from being performed concurrently. In this case (N in step S126), the update verification processing unit 11 sets, in the update information, information indicating that an upgrade is needed but download is not executable at present and transmits the update information to the user terminal 31 having transmitted the verification request (S131). The update information transmitted in this case corresponds to an instruction to prohibit application update.

In contrast, if the number of users currently performing the download does not reach the cap decided in step S124, the determination unit 13 determines that the download is executable from the network load viewpoint. In this case (Y in step S126), the update verification processing unit 11 sets, in the update information, information indicating that the upgrade is needed and that the download is executable at present to permit the download and transmits the update information to the user terminal 31 having transmitted the verification request (S127). The update information transmitted in this case corresponds to an instruction to update the application.

Figure 6:
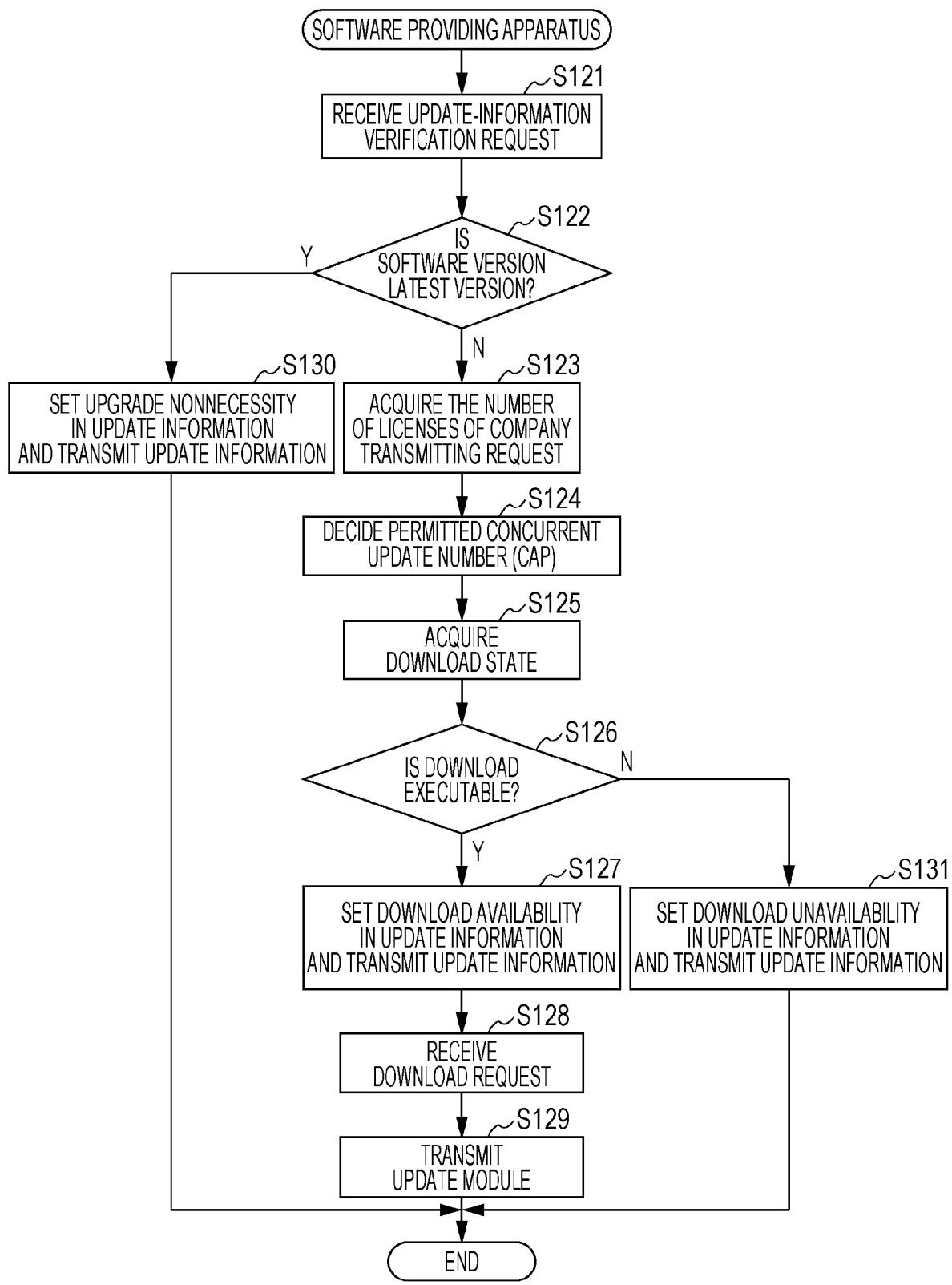
FIG. 6 is a flowchart illustrating a process executed by a software management server when the application installed in the user terminal is to be upgraded in Exemplary Embodiment 1.

Note that in the flowchart illustrated in FIG. 6, after the update verification processing unit 11 transmits the update information, the download processing unit 14 waits for a download request from the user terminal 31 and then receives the download request (S128). However, the process may be terminated once, and the steps to be performed after receiving the download request may be started separately.

Upon receiving the update information transmitted from the software management server 10 (S102), the user terminal 31 having transmitted the update-information verification request verifies the content of the settings of the update information.

If the information indicating that the upgrade is not needed is set in the update information (Y in step S103), the upgrade does not have to be performed because the application of the latest version has been installed. The process is thus terminated. If the information indicating that the upgrade is needed but the download is not executable at present is set in the update information (N in step S103 and N in step S104), the process is terminated without performing the upgrade because the download of the update module is prohibited at present. In this case, to perform the upgrade, the process is executed again after some period of time elapses.

If the information indicating that the upgrade is needed and the download is executable at present is set in the update information (Y in step S104), the user terminal 31 transmits the download request to the software management server 10 in accordance with a predetermined operation by the user (S105). The download request includes identification information (for example, an application name) regarding the application to be upgraded and the license management number of the application.

Upon receiving the download request transmitted from the user terminal 31 (S128), the download processing unit 14 in the software management server 10 reads out, from the update module repository 25, the update module associated with the application name included in the download request and transmits the update module to the user terminal 31 having requested the download (S129).

Note that even if the user receives the update information in which the information indicating that the upgrade is needed but the download is not executable at present is set, the user is only instructed that the upgrade of the application is prohibited. Accordingly, like the case where the download is executable, it may be possible to transmit the download request. Hence, the software management server 10 may be configured as follows. The software management server 10 temporarily stores a list of license management numbers or license IDs of users determined not to be permitted download. When receiving a download request, the software management server 10 performs matching between the license management number included in the download request and the license management numbers in the list. If the license management number matches any of the license management numbers in the list, the software management server 10 does not accept the download request. In this case, the software management server 10 may make a reply indicating unacceptance of the download request.

After acquiring the update module downloaded from the software management server 10 in answer to the download request (S106), the user terminal 31 executes the upgrade in accordance with predetermined operation steps performed by the user (S107). If the upgrade is successfully performed, the user terminal 31 updates the version information of the application held and managed in the user terminal 31 on the basis of the version of the update module that is typically the latest version (S108).

As described above, according to this exemplary embodiment, the cap information is provided, and the number of concurrently executable download operations may be limited on a per company basis in accordance with the permitted concurrent update number (that is, the cap) set in the cap information. In particular, if download operations are concurrently performed by a huge number of users due to a huge number of licenses in the agreement, network load is likely to increase to such a degree that exerts harmful effects. In this exemplary embodiment, a number smaller than the number of licenses in the agreement is set as the permitted concurrent update number, and thus the number of concurrently executable download operations may be limited, and a network load increase may be avoided.

In this exemplary embodiment, the licenses in the agreement with the company to which the user having requested the update-information verification belongs are added up in response to the request, and the permitted concurrent update number is obtained on the basis of the number of licenses thus added up. The license information is provided for all of the companies in common in this exemplary embodiment, while the permitted concurrent update number may be set, for example, on a per company basis. In this case, the permitted concurrent update number is decided in such a manner that the company to which the user having requested the update-information verification belongs is identified in response to the request. For example, if a number is decided with the network performance of the corporate system 30 taken into consideration and is thus set as the permitted concurrent update number, it is possible to cope with a network load increase on a per company basis more effectively.

In this exemplary embodiment, the software management server 10 transmits back, to the user terminal 31, the information indicating whether the update module is downloadable in response to the update-information verification request that is an example of the download-related request. The software management server 10 downloads the update module in answer to the download request separately transmitted from the user terminal 31 if the download is executable. However, steps performed until the download are not limited to these steps. For example, whether the update module is downloadable is determined in response to the download request transmitted from the user terminal 31 as the download-related request, instead of the update-information verification request. If the update module is downloadable, the update module may be downloaded. That is, in this case, the need for transmitting the update-information verification request is eliminated in the steps of downloading the update module.

For this exemplary embodiment, the case where the application has been installed in the user terminal 31 and the update module for upgrading the application is downloaded has heretofore been described. However, this exemplary embodiment is applicable to a case where the application is newly downloaded in a user terminal 31 in which the application has not been installed. In this case, for example, blank information regarding the version of the application to be included in the update-information verification request may be set, and the software management server 10 is thus notified that the verification request is transmitted for the purpose of new installation.

Exemplary Embodiment 2

Figure 8:
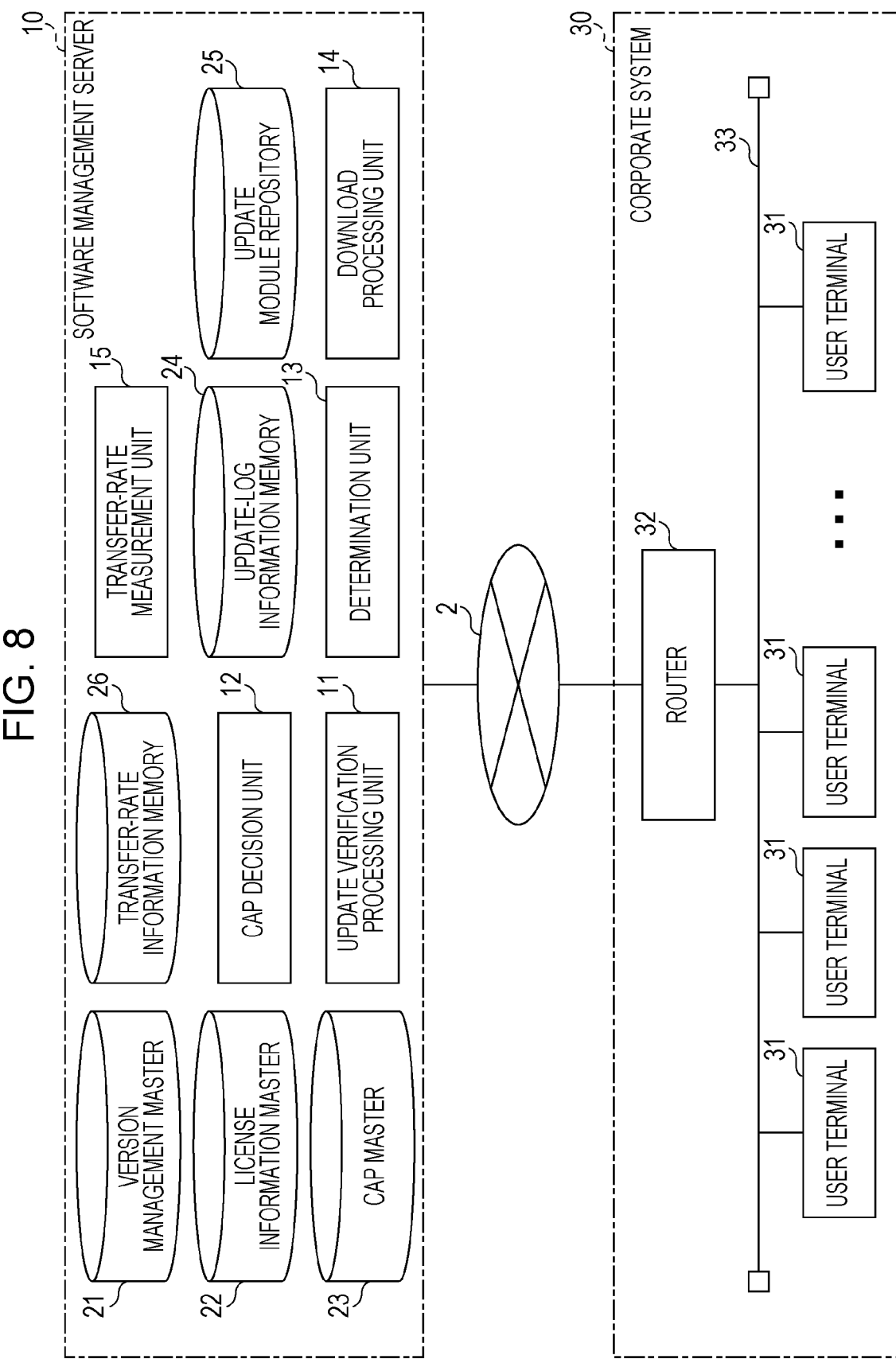
FIG. 8 is a diagram of the configuration of a network system including the software provider end and the user end in Exemplary Embodiment 2.

FIG. 8 is a diagram of the configuration of a network system including the software provider end and the user end in this exemplary embodiment on the basis of FIG. 1 in Exemplary Embodiment 1. The network system in this exemplary embodiment has a configuration in which a transfer-rate measurement unit 15 and a transfer-rate information memory 26 are added to the configuration of Exemplary Embodiment 1. The transfer-rate measurement unit 15 measures the transfer rate at the time when the download processing unit 14 downloads the software. The transfer-rate measurement unit 15 then records transfer rate information including the measured transfer rate in the transfer-rate information memory 26. In the transfer rate information recorded in the transfer-rate information memory 26, the transfer rate is set in association with the date and time of measuring the transfer rate. The transfer-rate measurement unit 15 is implemented in cooperation between the computer configured as the software management server 10 and a program run by the CPU installed in the computer. The transfer-rate information memory 26 is implemented by the HDD included in the software management server 10. Alternatively, the RAM or an external memory may be used via a network.

Hereinafter, operation in this exemplary embodiment will be described. The operation may basically be the same as that described for Exemplary Embodiment 1 by using the flowcharts illustrated in FIGS. 5 and 6. This exemplary embodiment involves with a slight addition of processes due to the use of the transfer rate.

First, the transfer-rate measurement unit 15 measures the transfer rate, generates the transfer rate information, and records the transfer rate information in the transfer-rate information memory 26. The process may be executed, for example, in a fixed cycle.

As described for Exemplary Embodiment 1, when the software management server 10 receives an update-information verification request from the user terminal 31, the cap decision unit 12 decides the permitted concurrent update number (that is, the cap) for the company in step S124 by referring to the license information and the cap information. In this exemplary embodiment, the transfer rate is referred to when the cap is decided.

The transfer rate is one of indexes enabling estimation of network throughput. The lowering of the transfer rate indicates a network load increase and a throughput reduction. Accordingly, the cap decision unit 12 analyzes the transfer rate information recorded in the transfer-rate information memory 26 and knows transfer rate transition. When a predetermined lowering tendency appears in the transfer rate transition, the cap decision unit 12 revises downward the permitted concurrent update number acquired by the extraction from the cap information as described above. The degree of the downward revision may be decided in accordance with a predetermined rule. For example, the cap may be decreased on the basis of the degree of the lowering of the transfer rate, in other words, the degree of the decrease of the cap may be revised. In Exemplary Embodiment 1, the permitted concurrent update number acquired by the extraction from the cap information is used as the cap without any modification. In contrast, in this exemplary embodiment, the permitted concurrent update number acquired by the extraction from the cap information as described above is revised downward, and thereby the cap is decided.

Note that the cap revised downward may be held. Instead of the permitted concurrent update number set in the cap information, the held cap may be used to decide the cap for a user who transmits the update-information verification request after the downward revision.

If the cap is decided by revising the permitted concurrent update number downward, it becomes less likely that the download is determined to be executable in step S126, and the number of users allowed to newly start the download may be reduced.

In Exemplary Embodiment 1, the permitted concurrent update number acquired by the extraction from the cap information is used as the cap without any modification. In contrast, in this exemplary embodiment, if the cap is revised downward when the network load tends to increase, network load may be restrained from being increased more. The other processes may be the same as those in Exemplary Embodiment 1, and thus description thereof is omitted.

The case where the network load increase is restrained has heretofore been described; however, for example, the cap decision unit 12 may increase the cap because the appearance of a predetermined rising tendency in the transfer rate transition is considered to indicate that the network load tends to decrease. This enables the cap revised downward to be changed to the original cap.

As described above, according to this exemplary embodiment, monitoring the network load state by using the index that is the transfer rate enables the cap to be corrected to a practically adaptable value.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A software providing apparatus comprising:
a processor, configured to:
decide a cap on a number of users permitted to concurrently perform a download of an update module of software in a customer having a plurality of users who use the software, the cap being decided when a request related to download via a network is received from one of the plurality of users in the customer, wherein the cap is associated with a number of purchased licenses of the software purchased by the customer; and
permit the plurality of users having transmitted the request to perform the download of the update module of the software if the number of the plurality of users currently performing the download of the update module of the software in the customer is smaller than the cap.

2. The software providing apparatus according to claim 1, wherein in a case where the customer concludes an agreement on licenses of the software each assigned to a corresponding one of the plurality of users to allow the user to use the software, the processor decides the cap on a basis of a number of licenses of the software in the agreement with the customer.

3. The software providing apparatus according to claim 2, wherein the processor sets, as the cap for the customer, a number smaller than the number of licenses of the software in the agreement with the customer.

4. The software providing apparatus according to claim 1, wherein the processor is further configured to:
download the update module of the software to the permitted user; and
record a transfer rate measured when downloading the update module of the software,
wherein the processor refers to the transfer rate and decides the cap for the customer.

5. The software providing apparatus according to claim 4, wherein when the transfer rate tends to lower, the processor decreases the cap.

6. The software providing apparatus according to claim 4, wherein when the transfer rate tends to rise, the processor increases the cap for the update module of the software.

7. The software providing apparatus according to claim 1, wherein when the number of purchased licenses of the software is a first quantity, the cap on the number of the plurality of users permitted to concurrently perform download of the update module of the software is decided to be a first number,
wherein when the number of purchased licenses of the software is a second quantity, the cap on the number of users permitted to concurrently perform download of the update module of the software is decided to be a second number,
wherein the first quantity is larger than the second quantity, and the first number is greater than the second number.

8. A non-transitory computer readable medium storing a program causing a computer to execute a process comprising:
deciding a cap on a number of users permitted to concurrently perform download of an update module of software in a customer having a plurality of users who use the software, the cap being decided when a request related to download via a network is received from one of the plurality of users in the customer, wherein the cap is associated with a number of purchased licenses of the software purchased by the customer; and
permitting the plurality of users having transmitted the request to perform the download of the update module of the software if the number of the plurality of users currently performing the download of the update module of the software in the customer is smaller than the decided cap.

* * * * *